United States Patent
Lucien et al.

[15] 3,664,467
[45] May 23, 1972

[54] DISC BRAKE COOLING DEVICE

[72] Inventors: Rene Lucien, Neuilly-sur-Seine; Jean Masclet, Paris, both of France

[73] Assignee: Meisser, Paris, France

[22] Filed: Aug. 4, 1969

[21] Appl. No.: 847,325

[30] Foreign Application Priority Data

Aug. 7, 1968 France....................162243

[52] U.S. Cl....................188/71.6, 188/264 AA, 192/113 A
[51] Int. Cl.........................................F16d 65/84
[58] Field of Search...........188/71.6, 264 R, 264 A, 264 AA, 188/264 P; 192/113 R, 113 A

[56] References Cited

UNITED STATES PATENTS

| | | | |
|---|---|---|---|
| 1,956,855 | 5/1934 | Colgren | 188/264 |
| 2,959,255 | 11/1960 | White | 188/264 |
| 3,217,844 | 11/1965 | Nelson et al. | 188/264 P |
| 3,301,357 | 1/1967 | Cussons et al. | 188/264 AA |

Primary Examiner—George E. A. Halvosa
Attorney—Waters, Roditi, Schwartz & Nissen

[57] ABSTRACT

In a disc-brake comprising a stub-axle, a brake structure and a plurality of discs, some of which rotate while others do not rotate, a system of cooling by forced centripetal air-circulation, comprising passages formed in said brake structure and located in the region at the center of said discs and communicating in said region with the external air passing between said discs, an annular conduit mounted on said brake structure and adapted to communicate with said passages, an air-suction means mounted on said stub-axle and adapted to suck the air from said annular conduit.

4 Claims, 6 Drawing Figures

DISC BRAKE COOLING DEVICE

The present invention relates to the cooling of disc brakes by forced centripetal air circulation, that is to say by air directed radially from the periphery of the discs towards their center.

The development of air transport has led over the past few years to the creation and exploitation of airlines over short and medium distances. Furthermore, with a view to earning profits, airline companies are seeking to reduce as far as possible the times of call of their aircraft and to accelerate the turn-round of the equipment.

One of the factors which limit this reduction in the time of call of an aircraft is the time necessary to evacuate the heat stored in the brakes during the course of landing. In order to accelerate the cooling of the brakes, it is thus necessary to replace their natural cooling by forced cooling, that is to say by forced ventilation, since the wheels are stationary.

It has already been proposed to utilize axial ventilation; but in that case the cool air only sweeps over the edge (peripheral or central) of the discs without passing over the sources of heat themselves (the surfaces in rubbing contact). This axial ventilation is therefore not good.

In the present state of the known art, it has already been proposed, for example in German Pat. No. 541,285, to employ centrifugal ventilation. FIG. 1 shows the application of this German Patent, which dates from 1929, to a modern wheel. The cool air is blown through a pipe $o$ into an annular chamber $p$ and becomes heated as it passes between the discs.

It will be observed that the hot air is thus blown on to the rim of the wheel $f$, that is to say in a particularly undesirable manner with regard to the bead of the pneumatic tire. It will also be noted that, due to lack of room, it is impossible to provide a collector for the hot air, the more so since it should have a section greater than that of the angular chamber $p$ (because of the heating of the air) and that it should furthermore be heat-insulated so as not to heat the tire itself, which results in a further increase in size.

The present invention has for its object to eliminate the disadvantage referred to above, and the dangers which result therefrom.

Briefly, the invention relates to the cooling of disc brakes by forced centripetal air circulation, that is to say, more precisely, by cool air drawn from around the periphery of the discs sweeping radially over the rubbing surfaces of the discs and the friction linings while absorbing heat, the air thus heated being drawn to the center of the discs by an annular collector with a suction means by which it is evacuated from the proximity of parts affected by heat.

The centripetal ventilation according to the invention can operate with the brakes off or on. The cooling obtained is obviously more rapid when the brakes are released, since they offer to the cooling air a wide radial path between the linings and the friction surfaces. The cooling obtained when the brakes are applied depends on the structure of the brake, and it is still very satisfactory when this structure provides permeability to air, for example when the friction linings are mounted on individual segments or shoes.

It is specified that the above-mentioned suction means for the hot air can evacuate the air radially or axially.

It is also specified that the ventilation according to the invention can be obtained by a suction device or other suction source, this source being possibly proper to a wheel or common to several wheels, or it may be independent of the aircraft (being for example mounted on a tender-trolley). It will be observed that if the suction source is mounted on the aircraft, it can be placed in a favorable position, so as not to interfere with the maintenance of the vehicle. For example on an aircraft, the fan can be mounted on the leg of the under-carriage.

There will also be noted a further advantage of the invention. The current of air sweeping over the rubbing surfaces according to the invention drives away the dust caused by wear, and the good cleanliness of these rubbing surfaces thus ensured, tends to improve the operation and increase the life of the brake.

The invention, its arrangements and advantages already stated, together with other arrangements and advantages, will now be described with reference to the accompanying drawings, given by way of non-limitating examples. In these drawings.

Figure 1:
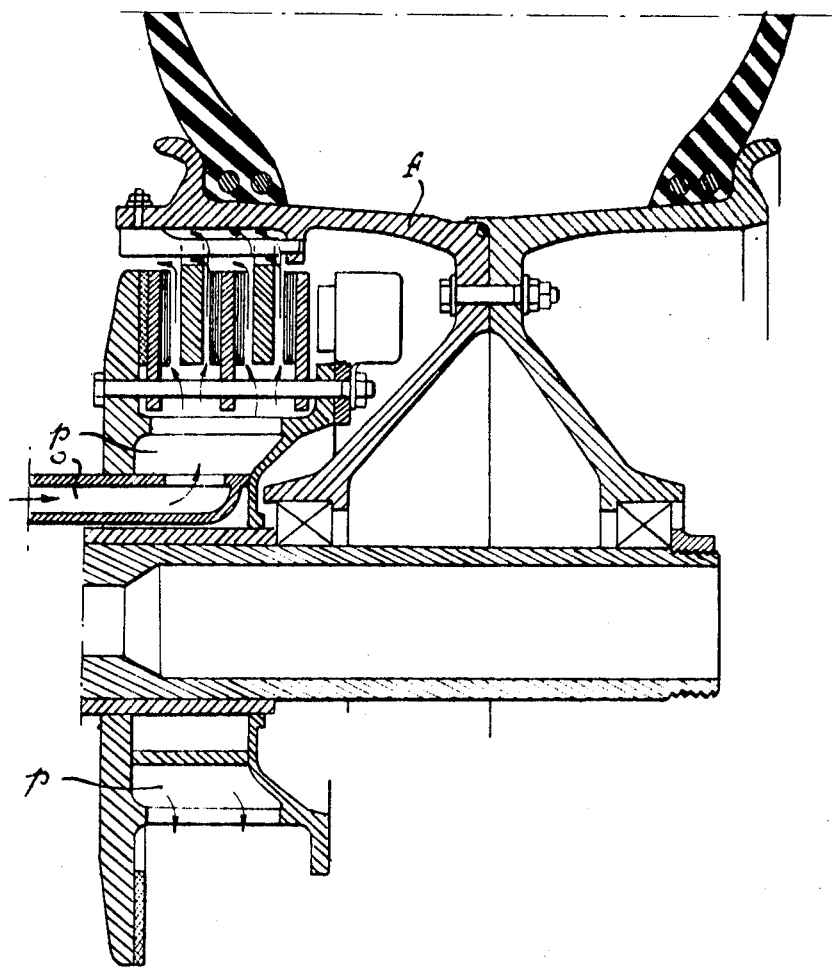
FIG. 1 is a general axial cross-section of a vehicle wheel brake including centrifugal ventilation means.
Figure 2:
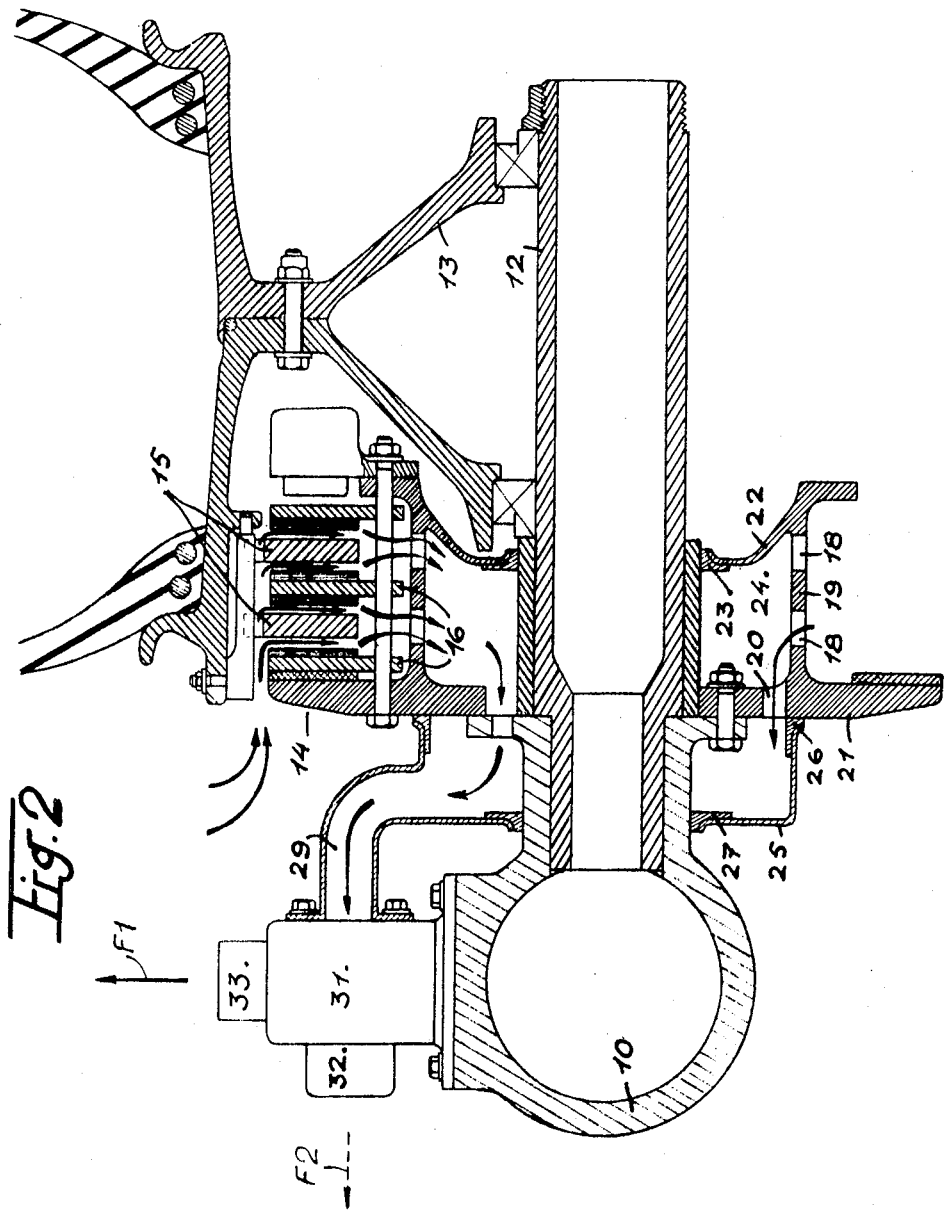
FIG. 2 is a general axial cross-section of one embodiment of the invention comprising a suction device.

With reference to FIG. 2, the structure 10 of the vehicle carries a stub-axle 12 on which turns a wheel 13. Inside the wheel 13 and fixed on the structure 10 is mounted a disc-brake 14. This brake 14 comprises rotors 15 and stators 16, which constitute wells of heat. The framework of the brake 14 comprises suction orifices, of which some, 18, pass through the central portion 19 in the form of a drum of the framework, the others 20 passing through the outer fixing plate 21 which fixes the brake.

The brake framework further comprises a wall 22 provided with a fluid-tight joint 23 and defining a chamber 24. On the plate 21 of the brake 14 and facing the orifices 20, an annular collector 25 is applied, the fluid-tightness being effected by means of rubber joints 26 and 27.

This collector 25 comprises a conduit 29 which is fixed on the suction orifice of a suction device 31, fixed in turn on the structure 10 of the vehicle. This suction device 31 is preferably driven by an electric motor 32 or by any other appropriate means. This suction device 31 comprises an ejection channel 33, opening to free air, preferably towards the rear of the vehicle, that is to say radially (arrow $F^1$). As previously stated, this ejection of hot air could also be effected axially (arrow $F^2$ in broken lines). The suction device 31 is preferably of the centrifugal type, but may also be of the axial type. This suction device 31 may also be common to and provide the cooling of several brakes, thus ensuring centralized ventilation, as stated above and as described below with reference to FIGS. 5 and 6.

The operation of this embodiment of the invention is as follows: when the vehicle has just been stopped by means of its brakes 14, the corresponding kinetic energy has been converted into heat and the stators 16 and the rotors 15 have been brought up to a high temperature.

The suction device 31 is then started-up. This creates a depression in the chamber 24 of the brake 14 and a circulation of air is produced. The cool air passes in between the wheel 13 and the plate 21 of the brake and circulates radially, sweeping over the surfaces of the rotors 15 and the stators 16 while extracting their heat.

The air thus heated then passes through the orifices 18 and 20 and passes into the collector 25, being then evacuated by the ejection conduit 33 of the suction device 31, following the arrow $F^1$ (or alternatively following the arrow $F^2$). The stators 16 and the rotors 15 of the brake 14 are thus rapidly cooled.

The above conditions apply for the vehicle when stationary with the brakes released, as shown. The clearance between the stators 16 and the rotors 15 provides a wide passage for the cooling air. However, as already stated, the cooling system according to the invention can be employed with the brakes applied (aircraft, maneuvering when parked).

Depending on the structure of the brake, the cooling air sweeps over the back and the sides of the individual shoes and the discs between the shoes, for example.

Figure 3:
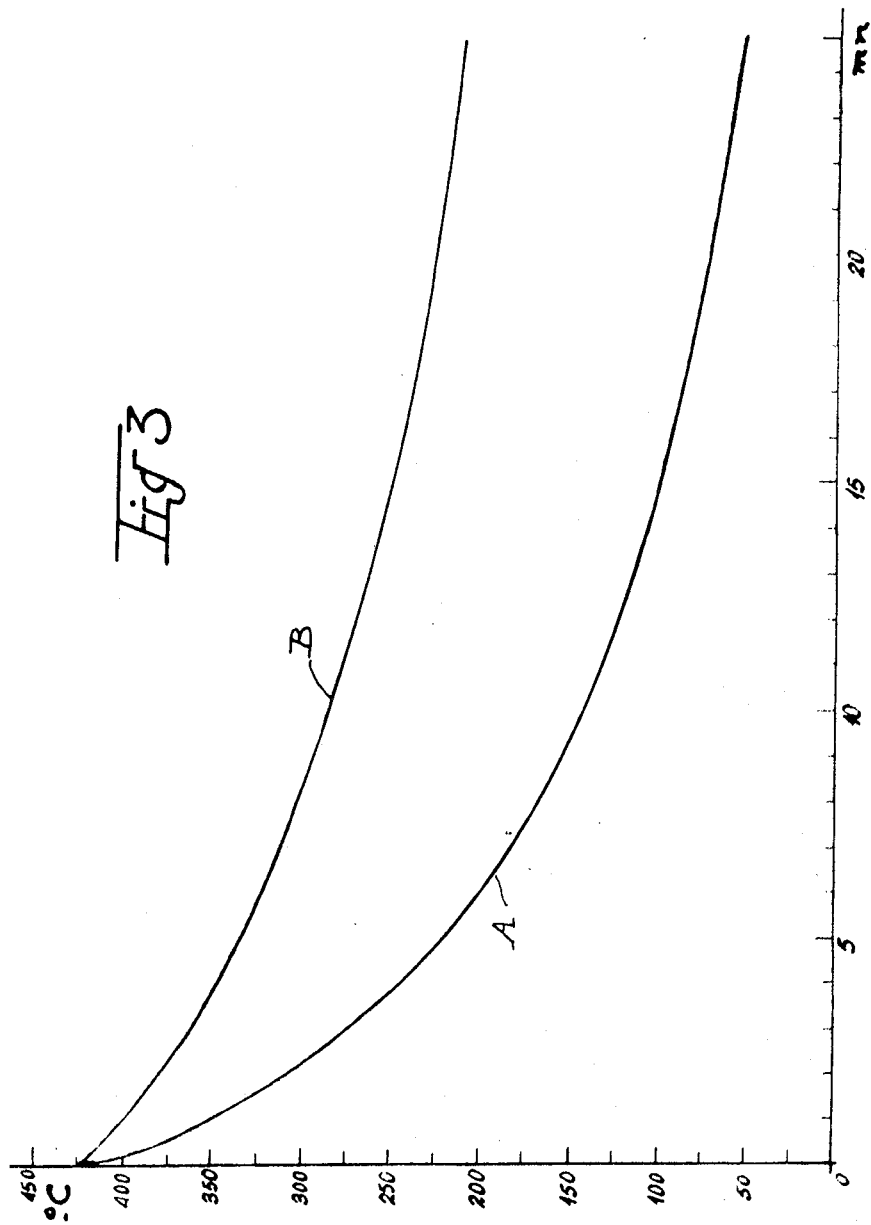
FIG. 3 is a diagram showing curves of cooling as a function of time, taken respectively without ventilation and with ventilation according to the invention.

By way of indication of the advantages obtained by the invention, there will now be described, with reference to FIG. 3, comparative tests carried out with the forced centripetal ventilation system according to the present invention, which have brought into evidence a very substantial reduction in the time necessary for cooling the brake. These comparative tests have been made with the brakes released. With the ventilation system according to the invention (curve A), the cooling time of the brake to bring the rotors down to a temperature of 50°C. is about one-fifth of the time necessary with the natural cooling system shown in curve B.

These tests were carried out at an ambient temperature of about 20°C.; a higher ambient temperature would make the advantages of the invention still more overwhelming. In this connection, it will be observed from FIG. 3 that after 25 minutes cooling at the said ambient temperature of 20°C., the temperatures reached were 215°C. for natural cooling and 60°C. with the cooling system according to the invention.

From FIG. 2 it is clear that, as already stated, the air which has become heated in contact with the brakes cannot in any way heat thermally-sensitive parts, the pneumatic tire in particular. On the contrary, and this constitutes a further advantage of the invention, the circulation of cool air sucked-in at the periphery of the discs 15 and 16 assists the cooling of the rim of the wheel and the pneumatic tire, if necessary.

It will furthermore be noted that the suction system according to the invention does not interfere in any way with the removal of the wheel.

Figure 4:
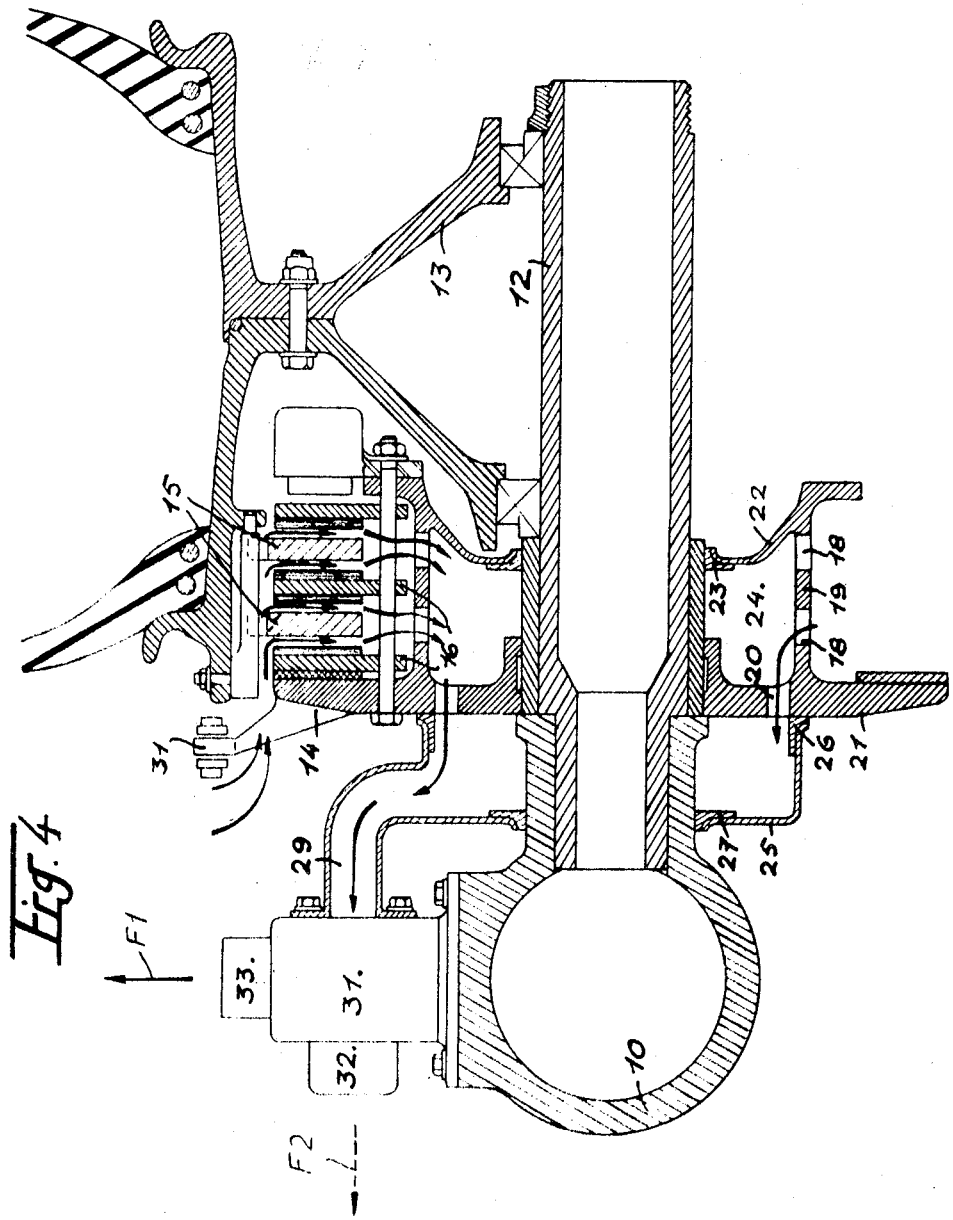
FIG. 4 is a general axial section of another form of embodiment of the invention, relating to brakes which oscillate on the stub-axle.

In the case of brakes oscillating on the stub-axle and comprising a torque-recovery arm 31 (FIG. 4), the collector 25 is only in contact with the plate 21 of the brake through the intermediary of the rubber joints 26 and 27. The brake can therefore oscillate in front of the collector without any drawback, and in particular without being restrained by it.

Figure 5:
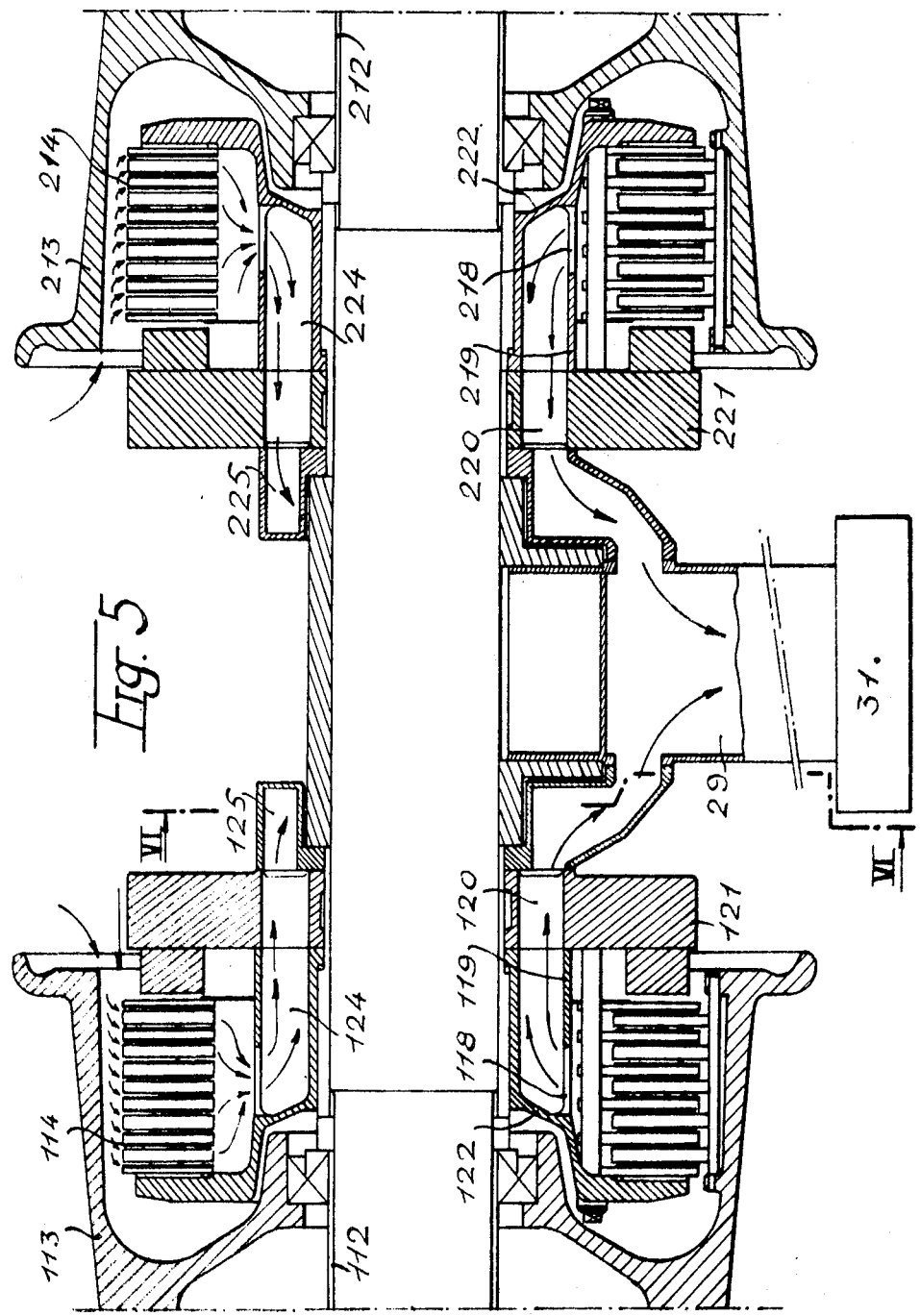
FIG. 5 is a general axial section of still another embodiment of the invention, comprising a single suction device for several wheels.
Figure 6:
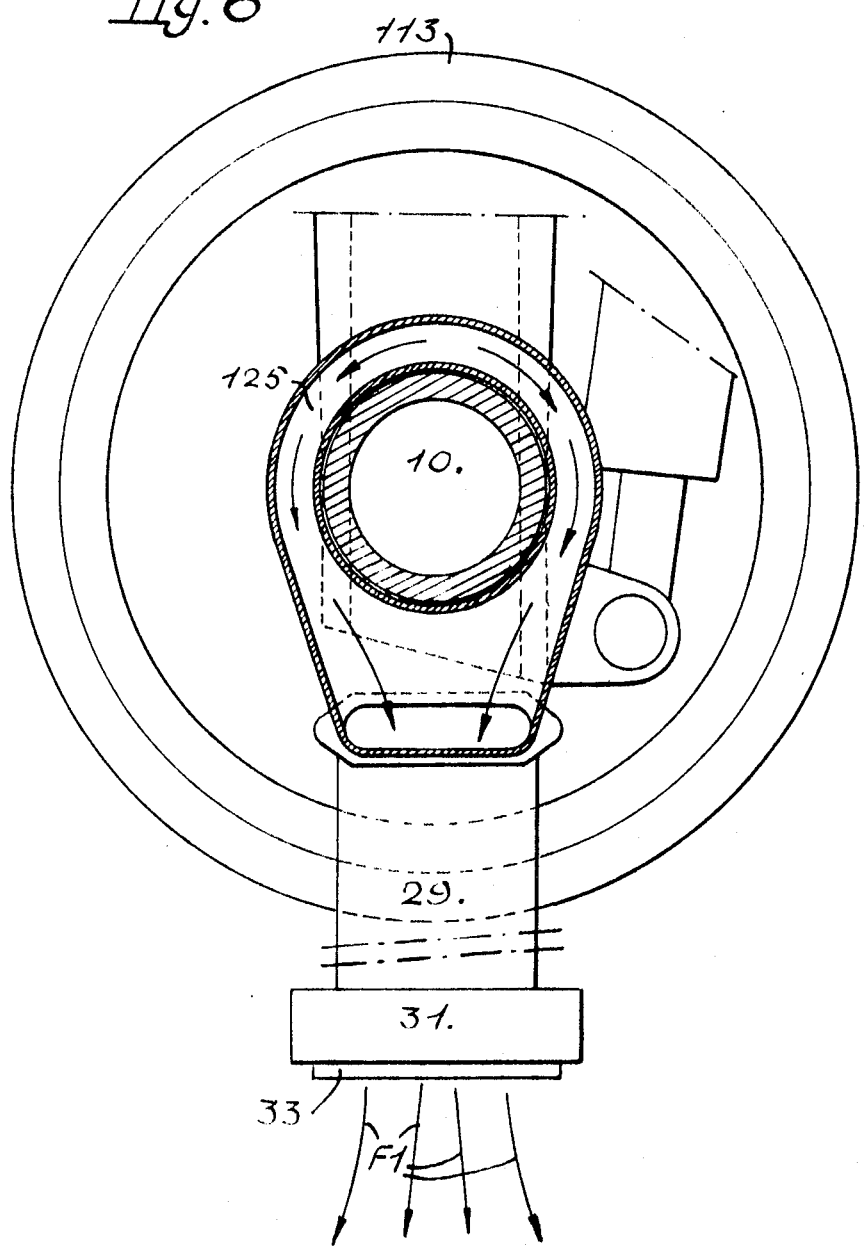
FIG. 6 is a transverse section taken along the line VI—VI of FIG. 5.

With reference to FIGS. 5 and 6 which show an embodiment of the invention having a single suction device for several wheels, for example for two wheels as shown, there are again shown the same arrangements with the same references increased by 100 for one wheel (the left-hand wheel in FIG. 5) and by 200 for the other wheel (the right-hand wheel of FIG. 5). The two annular collectors 125 and 225 of the two wheels open into a single conduit 29, with a single suction device 31 and a single ejection orifice 33 (arrows F¹).

What we claim is:

1. In a disc-brake comprising a stub-axle, a brake structure, and discs, some rotating and others non-rotating, a cooling system by forced centripetal air circulation, said brake structure comprising a central cylindrical protion traversed by orifices and located radially inwardly of said rotating and non-rotating discs, a radially extending end plate mounted on one side of said structure, a second radially extending end plate traversed by orifices mounted on the outer side of said structure, said cylindrical portion and the two said end plates forming an annular chamber, an air inlet passageway means positioned on said structure radially outwardly of said discs, said passageway means being in air flow communication with said annular chamber so as to convey external air thereto radially inwardly past said discs, an annular collector mounted on said stub-axle and connected to said second end plate by flexible joints and communicating with the orifices in said end plate, a conduit communicating with said collector and a suction device mounted exteriorly of said stub-axle sucking air into said conduit from said annular chamber.

2. In a braking system for vehicles, comprising a stub-axle for each wheel, a brake structure, and discs, some rotating and others non-rotating, a cooling system by forced centripetal air circulation, said brake structure comprising, for each wheel a cylindrical central portion traversed by orifices and located radially inwardly of said rotating and non-rotating discs, a first radially extending end plate mounted on one side of said structure, a second end plate traversed by orifices mounted on the other side of said structure, said cylindrical portion and said two end plates forming an annular chamber, air inlet passageway means in said structure positioned radially outwardly of said discs, said passageway means facilitating the radially inward flow of external air past said discs into said annular chamber, an annular collector mounted on said stub-axle and fastened to said second end plate by flexible joints and communicating with the orifices in said second end plate, and for a plurality of wheels, a single conduit communicating with said collectors, and a unitary suction device mounted exteriorly of said brake structure adapted to suck air from said conduit received from said collectors.

3. In a disc-brake comprising a stub-axle, a brake structure, and discs, some rotating and others non-rotating, a system of cooling by forced centripetal air circulation, comprising passages formed in said brake structure and located in the region at the center of and radially inwardly of said discs, air inlet passageway means positioned radially outwardly of said discs, said air inlet passageway means communicating with said region so as to facilitate external air passing radially inwardly between said discs, an annular conduit resiliently mounted on said brake structure so as to encompass said stub-axle and adapted to communicate with said passages, and air-suction means mounted on the exterior of said stub-axle and adapted to suck the air into said annular conduit from said passages.

4. A system as claimed in claim 3, including a plurality of brake structures, each said brake structure having one of said annular conduits, and a single suction means being provided exteriorly of said brake structures and adapted to suck air into said plurality of said annular conduits.

* * * * *